US006644419B1

(12) United States Patent
Chen

(10) Patent No.: US 6,644,419 B1
(45) Date of Patent: Nov. 11, 2003

(54) AIR-INPUT SPEED REGULATOR FOR PNEUMATIC TOOL

(76) Inventor: Li Chen Chen, No. 50, Chien Tsun East Rd., Taya hsiang, Taichung Hsien (TW)

( * ) Notice: Subject to any disclaimer, the term of this patent is extended or adjusted under 35 U.S.C. 154(b) by 0 days.

(21) Appl. No.: 10/329,380

(22) Filed: Dec. 27, 2002

(51) Int. Cl.$^7$ ................................................ B23B 45/04
(52) U.S. Cl. ........................ 173/169; 173/168; 173/218
(58) Field of Search ................................ 173/218, 168, 173/169, 170, 177, 216, 171

(56) References Cited

U.S. PATENT DOCUMENTS

| | | | | | |
|---|---|---|---|---|---|
| 4,778,015 | A | * | 10/1988 | Jacobsson | 173/169 |
| 4,834,131 | A | * | 5/1989 | Austin | 173/169 |
| 5,163,354 | A | * | 11/1992 | Bilodeau | 173/170 |
| 5,377,769 | A | * | 1/1995 | Hasuo et al. | 173/169 |
| 5,901,794 | A | * | 5/1999 | Schoeps et al. | 173/170 |
| 5,964,302 | A | * | 10/1999 | Lin | 173/218 |
| 6,164,387 | A | * | 12/2000 | Chang | 173/169 |

* cited by examiner

*Primary Examiner*—Scott A. Smith
(74) *Attorney, Agent, or Firm*—Rosenberg, Klein & Lee

(57) ABSTRACT

An air-input speed regulator for pneumatic tool includes an air intake connector having a seat and a tubular portion, and a regulating knob rotatably mounted around the connector. An axial channel is provided at one side of the seat of the connector for elastically receiving a steel ball therein, and front and rear air holes are axially sequentially formed on the tubular portion. The regulating knob includes a tube portion, a front end of which is formed into steps gradually lowered in a circumferential direction, and hollow projections spaced along an inner wall surface corresponding to the steps for engaging with the steel ball on the connector to locate the regulating knob in place. By turning the regulating knob, one of the steps is brought to cover the rear air hole by different extent and therefore changes the amount and speed of air flown to the pneumatic tool.

1 Claim, 8 Drawing Sheets

FIG.4-A

AIR-INPUT SPEED REGULATOR FOR PNEUMATIC TOOL

BACKGROUND OF THE INVENTION

The present invention relates to an air-input speed regulator for pneumatic tool, and more particularly to a regulator that can be easily turned to achieve the purpose of changing a magnitude of torque force of a pneumatic tool.

To change the magnitude of torque force of a pneumatic tool through control of air intake thereof, a flow controller 2 as shown in FIG. 1 is usually connected to a lower end of a pin-shaped air supply switch 1, as shown in FIG. 2. The flow controller 2 is provided at predetermined positions on a front wall with air holes 21 of different diameters, and at an internal space with a steel ball 22 and a spring 23. When the pin-shaped air supply switch 1 is pushed to move the steel ball 22 downward, air is admitted into an air passage of the pneumatic tool via the air holes 21 located at a clearance between the steel ball 22 and a seal ring 24 around a joint of the flow controller 2 and the air supply switch 1, so as to change the flow of air supplied to the tool. In brief, the conventional way of adjusting the torque force of a pneumatic tool is to push and turn the air supply switch 1 to open one of the air holes 21 having different diameters and thereby changes amount and speed of airflow supplied to the tool. The forming of air holes 21 of different diameters disadvantageously complicates the manufacturing of the flow controller 2 to increase the manufacturing cost thereof.

SUMMARY OF THE INVENTION

It is therefore a primary object of the present invention to provide an improved air-input speed regulator for pneumatic tool that can be more easily manufactured at reduced cost and be more conveniently operated.

To achieve the above and other objects, the air-input speed regulator for pneumatic tool of the present invention mainly includes an air intake connector having a seat and a tubular portion forward extended from the seat, and a regulating knob rotatably mounted around the connector. Front and rear air holes are axially sequentially formed on the tubular portion of the connector. The regulating knob includes a front tube portion, a front end of which is formed into a plurality of steps gradually lowered in a circumferential direction. By turning the regulating knob, one of the steps is brought to cover the rear air hole on the connector by different extent and therefore changes the amount and speed of air supplied to the pneumatic tool, and thereby regulates the torque force of the tool.

The air intake connector of the air-input speed regulator of the present invention is provided at one side of the seat with an axial channel for receiving a steel ball and a spring therein, and the regulating knob is provided along an inner wall surface with a plurality of circumferentially spaced hollow projections to each correspond to one of the steps. When the regulating knob is turned, one of the hollow projections is brought to engage with the steel ball on the connector and thereby locates the regulating knob in place relative to the connector.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 4A is an enlarged rear perspective view of a regulating knob included in the present invention;

DETAILED DESCRIPTION OF THE PREFERRED EMBODIMENTS

Figure 1:
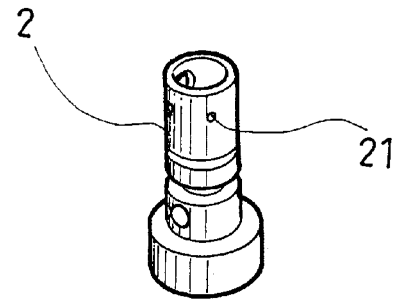
FIG. 1 is a perspective view of a conventional flow controller.
Figure 2:
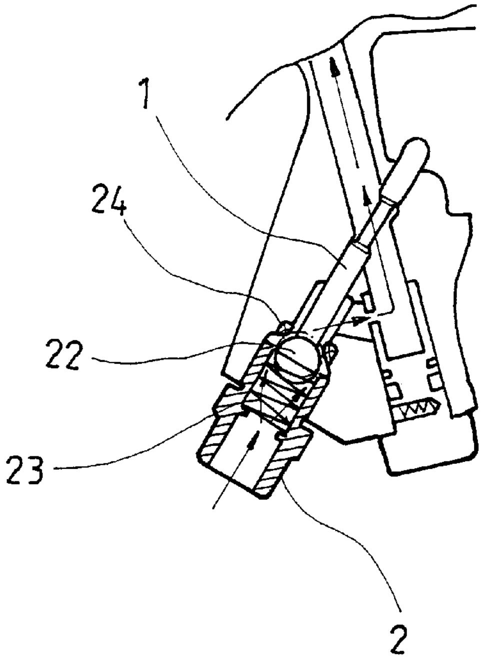
FIG. 2 shows an example of using the conventional flow controller of FIG. 1 with a pneumatic tool.
Figure 3:
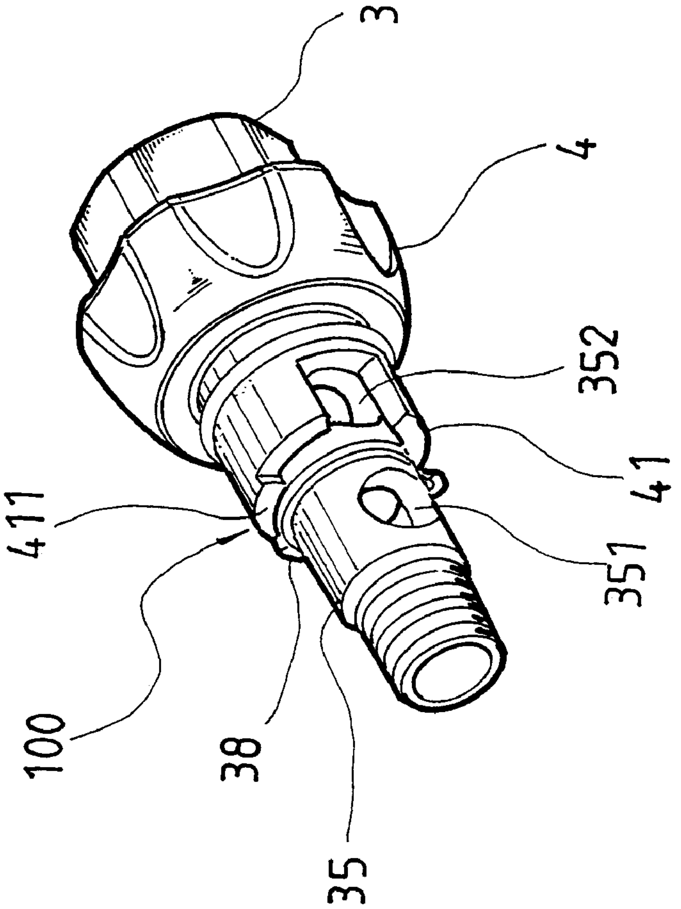
FIG. 3 is an assembled perspective view of an air-input speed regulator for pneumatic tool according to the present invention.
Figure 4:
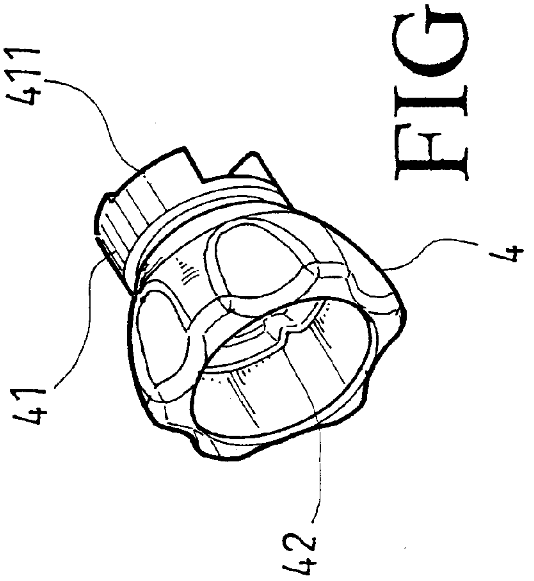
FIG. 4 is an exploded perspective view o f FIG. 3.
Figure 4:
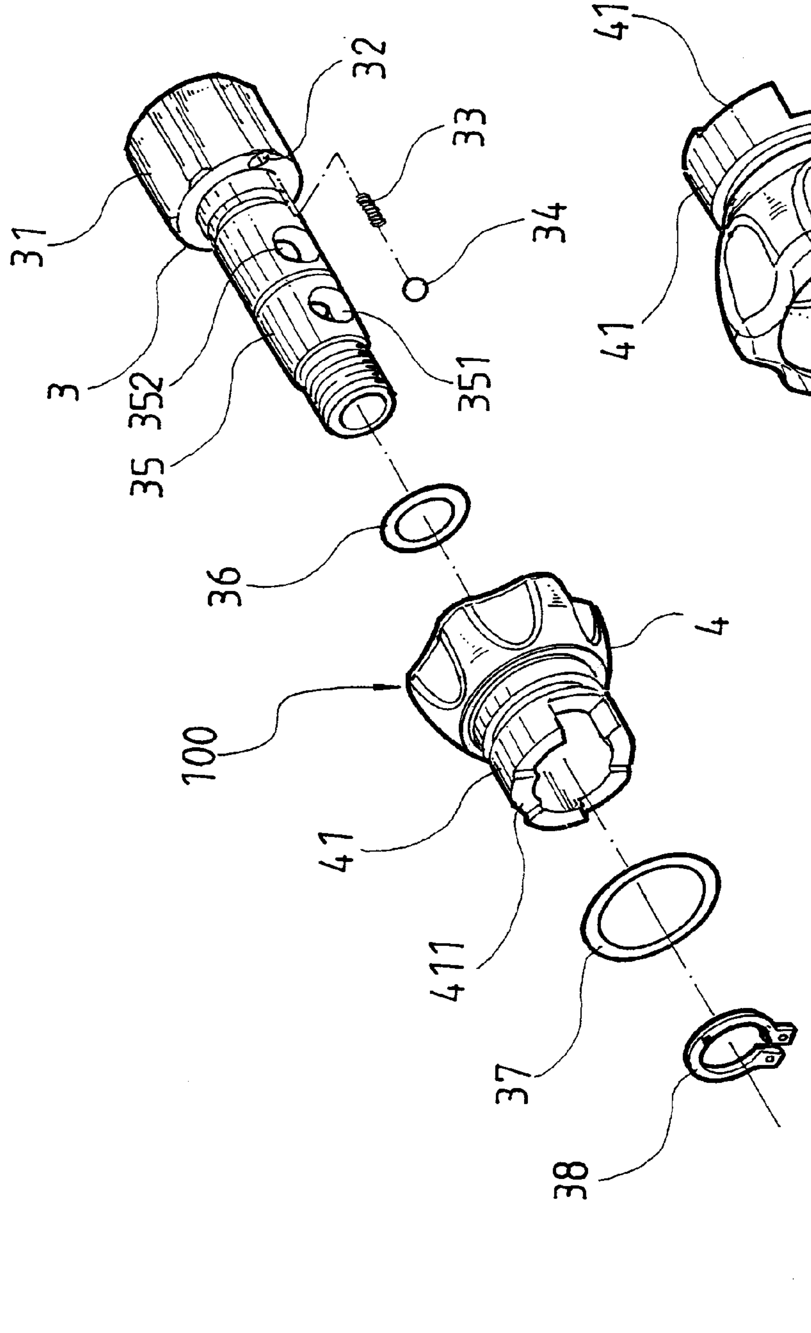
Figure 5:
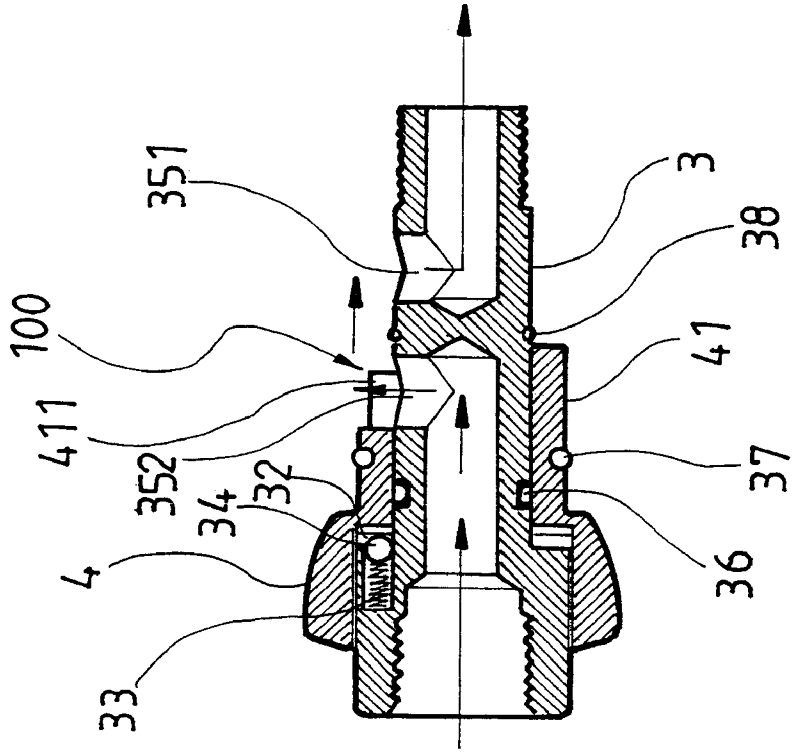
FIG. 5 is a sectional view of FIG. 3.

Please refer to FIGS. 3, 4, 4A, and 5 at the same time, in which an air-input speed regulator 100 according to the present invention is shown. The air-input speed regulator 100 mainly includes an air intake connector 3 and a regulating knob 4 mounted around the air intake connector 3 at a predetermined position.

The air intake connector 3 includes a seat portion 31, to one side of which there is provided an axially extended channel 32 for receiving a spring 33 and a steel ball 34 therein. An elongate tubular portion 35 is forward extended from a front end of the seat portion 31, and has a front and a rear air hole 351, 352 axially sequentially arranged thereon.

The regulating knob 4 includes a substantially short tube portion 41 forward extended from a front end thereof. A front end of the short tube portion 41 is formed into a stepped surface to include a plurality of steps 411 gradually lowered in a circumferential direction. As can be seen from FIG. 4A, a plurality of hollow projections 42 are spaced along an inner wall surface of the regulating knob 4 to each correspond to one of the steps 411.

To assemble the air-input speed regulator 100 of the present invention, simply extend the tubular portion of the connector 3 through the regulating knob 4 with two O-rings 36 and 37 separately put around the connector 3 and the regulating knob 4 at predetermined positions. A C-ring 38 is then used to firmly hold the regulating knob 4 to the tubular portion 35 of the connector 3.

By turning the regulating knob 4 relative to the connector 3, the steps 411 of different heights formed on the front end of the tube portion 41 of the regulating knob 4 are brought to cover the rear air hole 352 on the tubular portion 35 of the connector 3 by different extents. That is, the steps 411 are adapted to change an effective communicating area of the rear air hole 352 to therefore change the flow of air supplied to the pneumatic tool and adjust the torque force producible by the tool. Moreover, when the knob 4 is turned, one of the hollow projections 42 on the inner wall surface of the knob 4 is engaged with the steel ball 34 elastically received in the channel 32 to retain the knob 4 to a desired location relative to the connector 3 for one of the steps 411 to open or cover the rear air hole 352.

Figure 6:
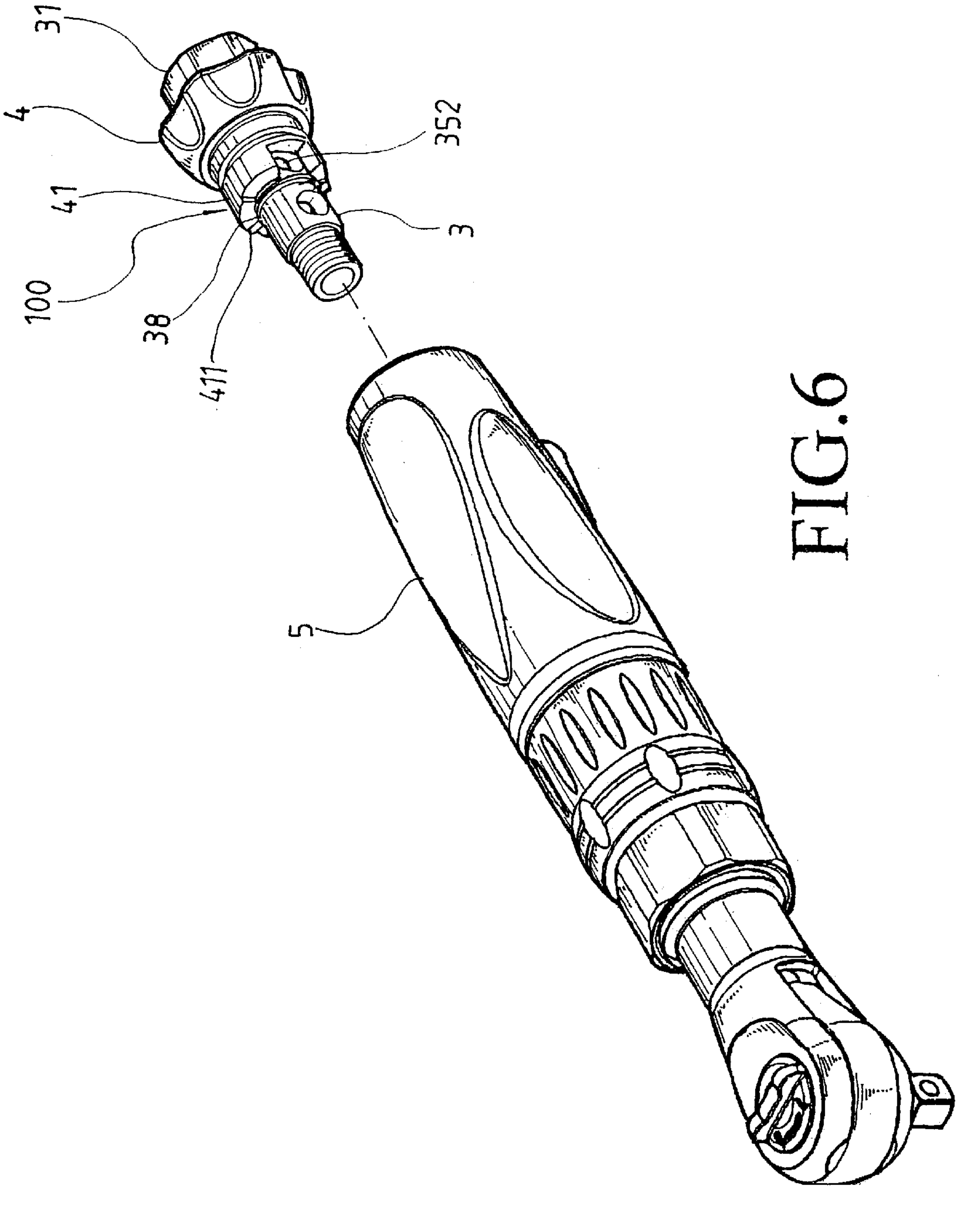
FIGS. 6, 7, and 8 show examples using the present invention with different pneumatic tools.
Figure 7:
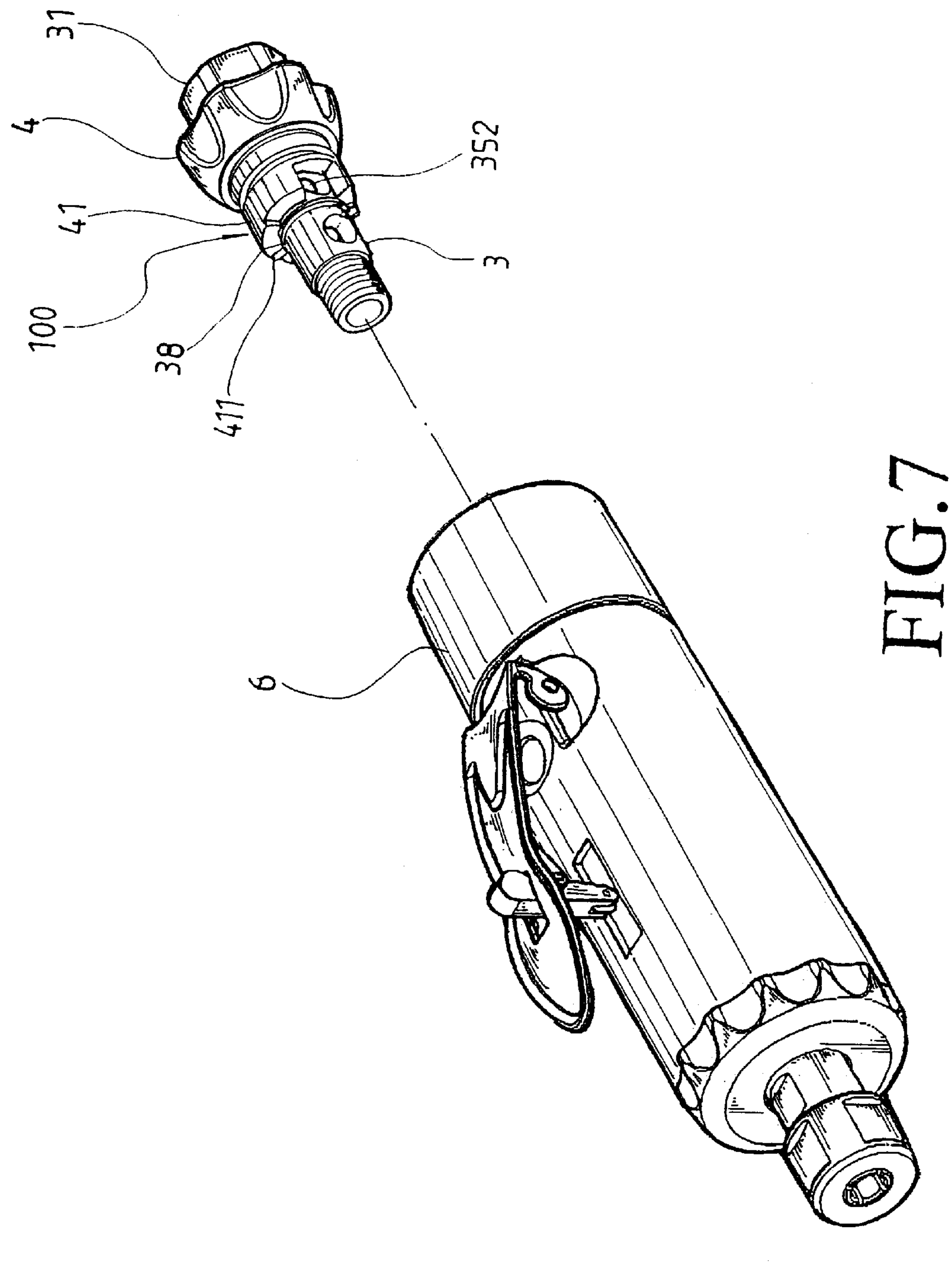
Figure 8:
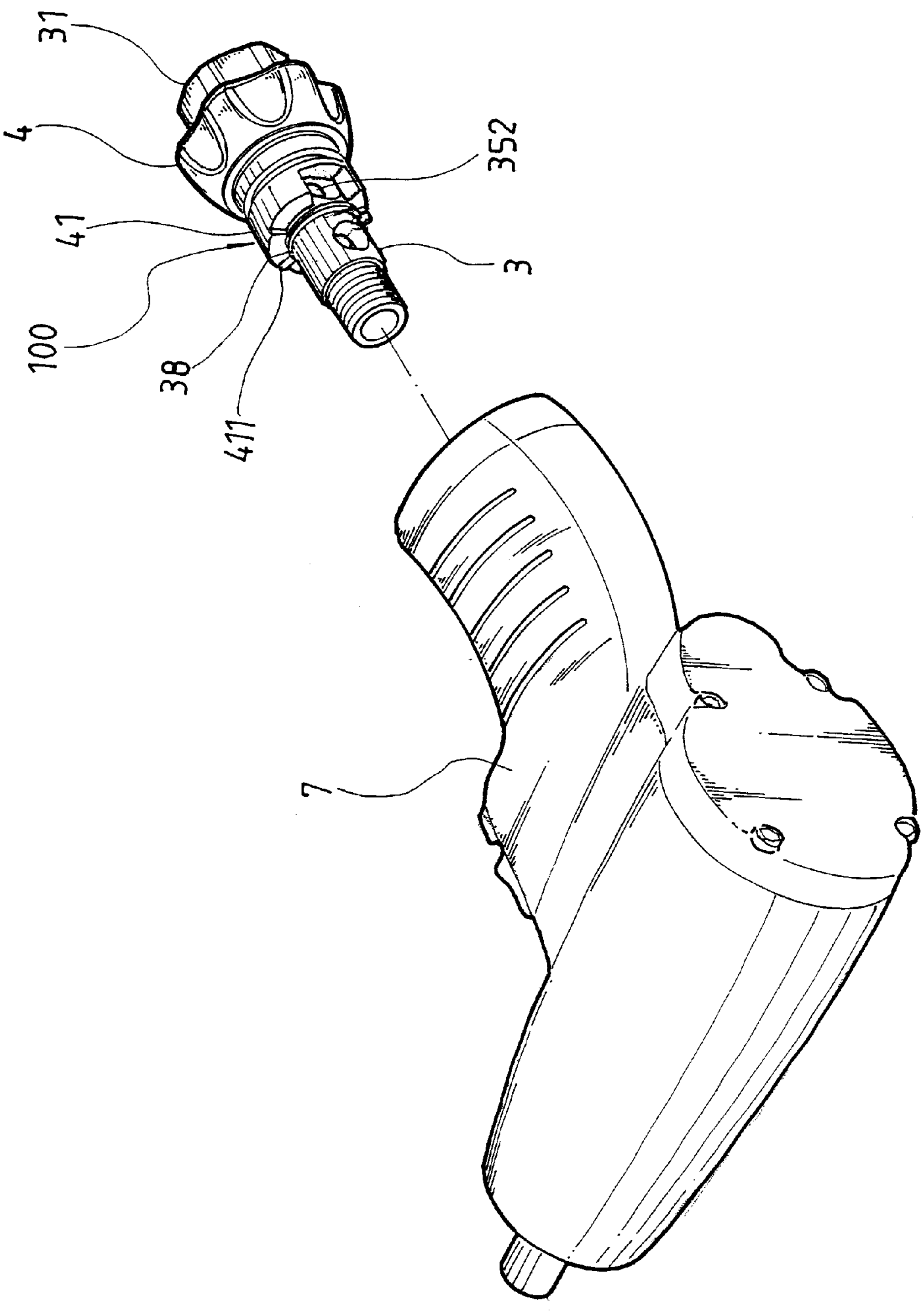
Figure 9:
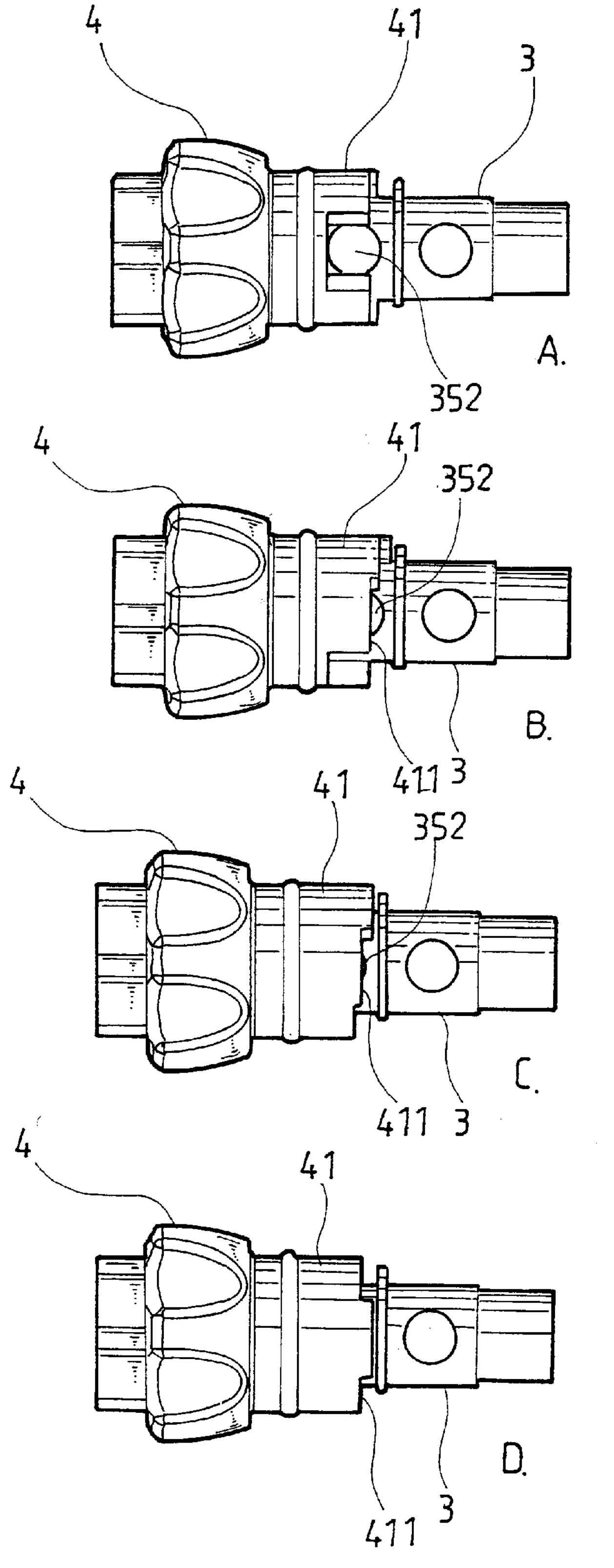
FIGS. 9A to 9D show the operation of the present invention.

Please refer to FIGS. 6, 7, and 8. The air-input speed regulator 100 of the present invention may be connected to various types of pneumatic tools 5, 6, and 7 to achieve the purpose of adjusting the torque force of these tools.

FIGS. 9A to 9D show operations of the air-input speed regulator 100. To use the air-input speed regulator 100, simply turn the regulating knob 4 until a desired one of the steps 411 on the short tube portion 41 of the regulating knob 4 is brought to fully open or partially or completely cover the rear air hole 352 on the tubular portion 35 of the connector 3, as sequentially shown from FIGS. 9A to 9D, so as to change the effective communicating area of the rear air hole 352 and accordingly the amount of air flown through the air-input speed regulator 100 into the pneumatic tool, allowing the latter to produce different torque force depending on actual need.

What is claimed is:

1. An air-input speed regulator for pneumatic tool, comprising:

an air intake connector having a seat, at one side of which there is provided an axially extended channel for receiving a steel ball and a spring therein, and an elongate tubular portion forward extended from a front end of said seat and having front and rear air holes sequentially provided at predetermined positions in an axial direction; and a regulating knob including a forward extended short tube portion, a front end of which is formed into a stepped surface to include a plurality of steps gradually lowered in a circumferential direction, and a plurality of hollow projections circumferentially spaced along an inner wall surface of said regulating knob to each correspond to one of said steps;

said tubular portion of said air intake connector being axially forward extended through said regulating knob, and said regulating knob being turnable relative to said air intake connector to bring one of said steps on the front end of said tube portion of said regulating knob to cover said rear air hole on said tubular portion of said connector by different extent, and one of said hollow projections to engage with said steel ball on said connector to locate said regulating knob in place, so as to change an effective air communicating area of said rear air hole and accordingly an amount of air flown through said rear air hole, enabling said pneumatic tool to produce different torque force.

* * * * *